Figure 1:
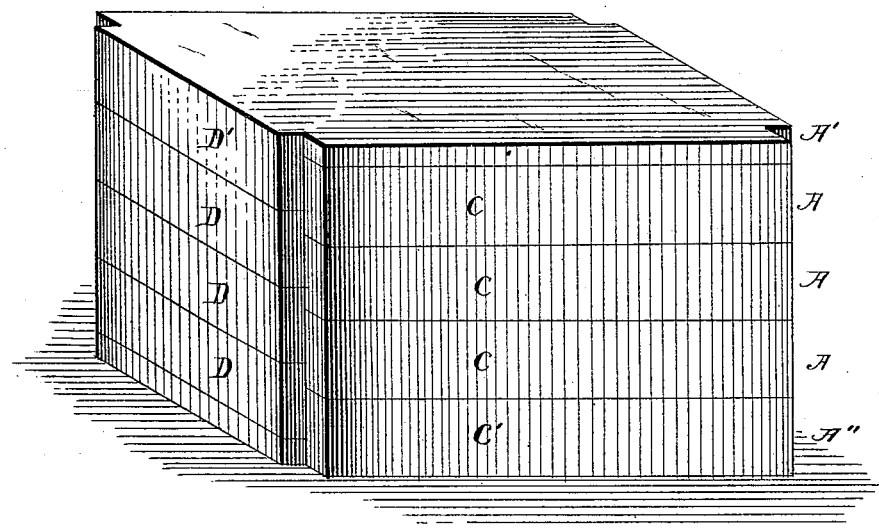

(No Model.) 4 Sheets—Sheet 1.

I. S. HYATT.
APPARATUS FOR MOLDING CELLULOID AND ANALOGOUS PLASTIC MATERIAL.

No. 275,216. Patented Apr. 3, 1883.

Witnesses;
Chas. C. Gill
Herman Gustow

Inventor;
Isaiah Smith Hyatt,
By his Attorney.
Rowland Cox (No Model.) 4 Sheets—Sheet 2.

I. S. HYATT.
APPARATUS FOR MOLDING CELLULOID AND ANALOGOUS PLASTIC MATERIAL.

No. 275,216. Patented Apr. 3, 1883.

Witnesses:
Chas. P. Gill
Herman Gustow

Inventor:
Isaiah Smith Hyatt,
By his Attorney,
Rowland Cox (No Model.) 4 Sheets—Sheet 3.
I. S. HYATT.
APPARATUS FOR MOLDING CELLULOID AND ANALOGOUS PLASTIC MATERIAL.

No. 275,216. Patented Apr. 3, 1883.

Witnesses;
Chas. C. Gill
Herman Gustow

Inventor;
Isaiah Smith Hyatt,
By his Attorney,
Rowland Cox (No Model.) 4 Sheets—Sheet 4.
I. S. HYATT.
APPARATUS FOR MOLDING CELLULOID AND ANALOGOUS PLASTIC MATERIAL.
No. 275,216. Patented Apr. 3, 1883.
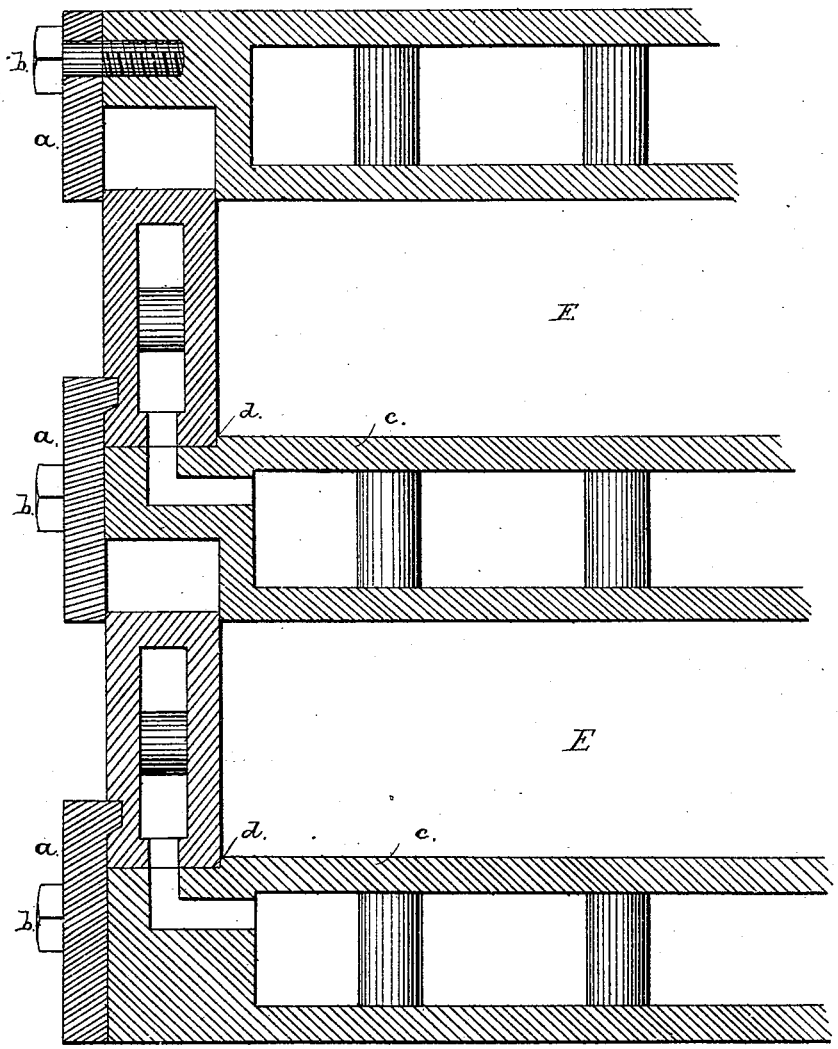

UNITED STATES PATENT OFFICE.

ISAIAH S. HYATT, OF MORRISTOWN, NEW JERSEY, ASSIGNOR TO THE CELLULOID MANUFACTURING COMPANY, OF NEW YORK, N. Y.

APPARATUS FOR MOLDING CELLULOID AND ANALOGOUS PLASTIC MATERIAL.

SPECIFICATION forming part of Letters Patent No. 275,216, dated April 3, 1883.

Application filed January 23, 1883. (No model.)

*To all whom it may concern:*

Be it known that I, ISAIAH SMITH HYATT, a citizen of the United States, residing at Morristown, in the county of Morris and State of New Jersey, have invented certain new and useful Improvements in Apparatus for Molding Celluloid and Analogous Plastic Material; and I do hereby declare the following to be a full, clear, and exact description of the invention, such as will enable others skilled in the art to which it appertains to make and use the same.

The invention relates to an improvement in processes and apparatus for the manufacture of sheets of "celluloid" and analogous plastic material, and especially to an adaptation of the principles of the process and apparatus illustrated in Letters Patent No. 199,908, granted to John W. Hyatt, February 5, 1878. By the method described in said patent the material is placed in a chase having a bottom of peculiar construction, and submitted to a hydraulic press having a platen of proper size to enter between the sides and ends of the chase and press the plastic material into a solid slab. The chase is then taken from the hydraulic press, its sides and ends are removed, leaving the slab of material clinging to the bottom of the chase, after which the block is placed on a planing-machine and reduced to sheets of any desired thickness, all as described in said patent.

By my invention I simplify the process and apparatus for forming the slab of material, and afford a means of producing a number of such slabs at one operation of the hydraulic press. After the slabs of material have been formed according to my invention they may be submitted to a planing-machine such as that described in said Patent No. 199,908, and reduced to sheets, or to any planing-machine capable of effecting the division of the slabs into sheets.

My invention will be more fully understood from the detailed description hereinafter presented, reference being had to the accompanying drawings, forming a part of this application, wherein—

Figure 2:
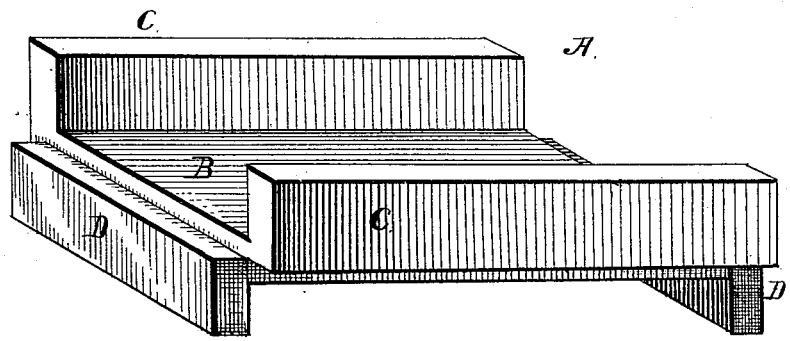
Figure 3:
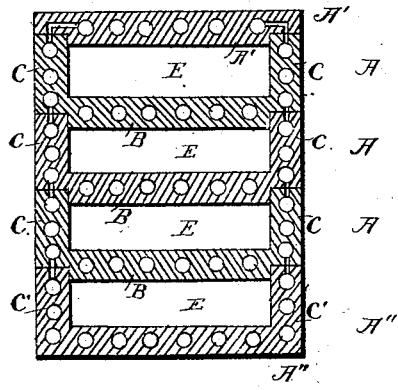
Figure 4:
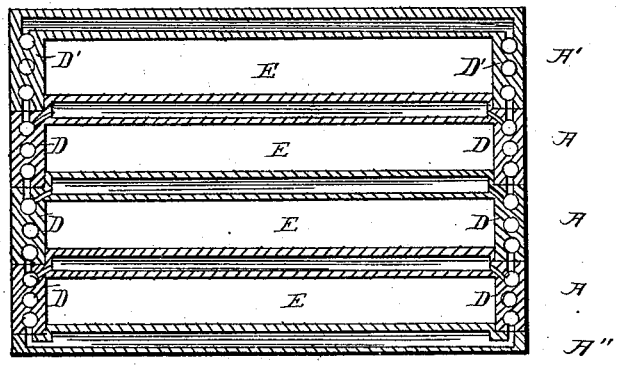
Figure 5:
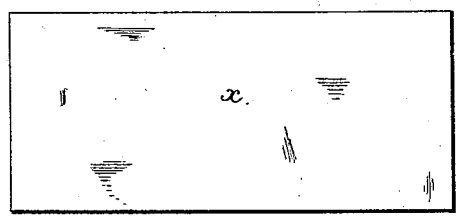
Figure 6:
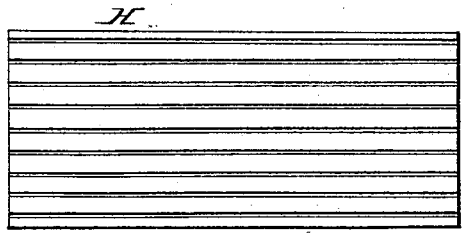
Figure 7:
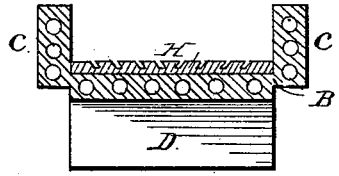

Figure 1 is a perspective view of an apparatus embodying the invention. Fig. 2 is a perspective view of one of the interior sections thereof. Fig. 3 is a central vertical transverse section through the apparatus. Fig. 4 is a central vertical longitudinal section through the same. Fig. 5 is a view of a sheet of zinc hereinafter mentioned. Fig. 6 is a detached view of the independent grooved base-plate. Fig. 7 is a central vertical transverse section of one of the interior parts of the apparatus, showing the grooved plate in position; and Fig. 8 is an enlarged detached view of a modified form of apparatus hereinafter described.

The apparatus shown is in the nature of a die or mold made in sections and capable of use for molding or forming several slabs at one operation of the press. With slight modifications it may be made to form a number of articles of the same or varied contour from any material which becomes plastic under heat and which will assume form when subjected to pressure.

Each of the interior sections (lettered A) of the apparatus consists of the base-plate B, having upwardly-projecting sides C and downwardly-extending ends D, which sides and ends will be of such proportions that the former will receive at the inner corners of their ends the downwardly-projecting ends of the next superimposed section A, and that the said downwardly-extending ends D first mentioned will fit against the inner corners of the extremities of the next lower section A. Thus when the sections A are arranged one over the other the inner corners of the upwardly-extending sides and of the downwardly-projecting ends will meet and inclose the material to be treated. It will be observed that the base of one section and its depending ends serve as the top and ends for the section beneath it, and that when a number of the sections are arranged one over the other in the manner specified matrices E will be formed between them, in which the material may be given form. The upper section, A', of the apparatus will have no upwardly-projecting sides, but only the downwardly-extended ends D', and the lower section, A'', of the apparatus will have only the sides C'. Thus it will be noted that the apparatus will have a plain upper and lower surface, and that its matrices E are all inclosed.

In the drawings I have illustrated an apparatus in which three interior sections and an upper and lower section are employed, and in the employment of such a construction I secure four matrices, in which the material may be molded at one operation, each matrix being entirely inclosed and having no communication with those adjacent to it. Of course any number of sections may be made use of, as may be desired.

In the employment of the apparatus the material to be treated is placed between the sides of the lower section and the first interior section placed over it. Then this interior section is filled with the material and another section, which is subsequently filled, placed over it, and so on until all the sections contain the material, when the top section is placed in position, and at this time the apparatus may be submitted to the press and the material molded.

Various methods of constructing the sections of the die will suggest themselves; but I recommend that each section be cast in one piece with hollow or cored sides, ends, and bottom, for the purpose of receiving a heating or cooling agent, as indicated in Figs. 3, 4, 7, and 8 of the drawings. The application of the heating or cooling agent to the hollow sides and bottom of the mold or die is substantially the same as that described in said Letters Patent No. 199,908, and will be fully understood by those skilled in the art to which the invention relates without a more detailed explanation.

When it is not desired to attach the slab of material to the base of the mold, and to permit the ready removal of the block of molded material from the sections A, it will simply be necessary to place on the base of each section a sheet of zinc, $x$, of appropriate size, upon which the block or slab may be formed, and which may be easily withdrawn from the die after its removal from the press. It is necessary to secure the block of material to the bed-plate of the planing-machine when it is desired to form the sheets, and as a conveniemt means for enabling the operator to attach the said block or slab to the planing-machine I attach the same by heat and pressure upon an independent plate, H, provided with grooves or projections in the customary way, which independent plate may be directly secured to the bed of the planing-machine; or, in lieu of thus securing the slab of material on the planer, I may substitute the independent plate H for the sheet of zinc $x$, and when this is done the slab of material, upon its removal from the die, will be found to be firmly attached to the plate, and in proper condition to be at once submitted to the planing-machine. In this manner the dies or molds are always kept in condition for molding new blocks or slabs, and there is no unnecessary time or labor expended in submitting the slabs to the planer.

The apparatus illustrated is specially adapted for molding material into slabs or blocks of rectangular form; but it is obvious that the material may be given varied form by appropriately constructing the interior of the sections composing the die or mold according to the particular configuration to be produced.

In the foregoing description I have set out the preferred embodiment of my invention; but it is obvious that various constructions may be produced which will form an apparatus such as that hereinbefore described, in which several blocks, slabs, or other articles may be formed at one operation.

In Fig. 8 of the drawings I illustrate in a detached sectional view a construction which may be employed with good results. In this construction the sides and ends are detachable from the base, and their relation to each other and to the base will be preserved by plates $a$ and bolts $b$, as indicated. The edges of the base-plates $c$ will preferably be grooved, as at $d$, to receive the edges of the sides and ends of the sections, and the parts of the apparatus will also by preference be cast hollow or cored out, as indicated, to receive and permit the passage through the same of heating or cooling agents; but it is not essential that all of the parts be hollow, the essential consideration being only that they be so arranged and constructed that the proper degree of heat can be effectually applied.

Instead of employing the inclined grooves in the plate H, the upper surface of said plate may be constructed in other ways, as set forth in said Letters Patent No. 199,908, the only essential condition being that the surface to be utilized in holding the block be such as to effect that result. I prefer to use a plate that is grooved, but do not limit myself to any particular construction. It is obvious, too, that the plate may be supplemented by mechanical agencies, so that even if the adhesion be insufficient to hold the block so that it can be planed, unless such agencies be added, the principal object of the invention will be effected. Thus I have found that even if the upper surface of the plate is very slightly roughened it can be used with satisfactory results when intelligently employed. It will only be necessary in such cases, to insure a satisfactory result, to secure the edges of the block or slab, the adhesion accomplished by the pressure being sufficient to prevent a dislocation of the body of the block by its separation from the plate, and, if the roughening be sufficient, it will operate quite as satisfactorily as other expedients. Nevertheless, I recommend the employment of the plate H in the form and manner hereinbefore set forth as being especially conducive to good results.

What I claim as my invention, and desire to secure by Letters Patent, is—

1. A die or mold formed of sections, each of the interior of which consists of a base having sides and ends projecting in opposite directions therefrom, the whole forming a die or apparatus adapted to mold two or more articles at one operation, substantially as set forth.

2. A die or mold consisting of interior sections having a base, and sides and ends projecting in opposite directions therefrom, and a top and bottom section having a plain exterior surface, substantially as set forth.

3. The section A, consisting of a base having ends and sides projecting in opposite directions therefrom, and supplied with a top and bottom section having projecting ends or sides, respectively, and adapted to complete the mold or die, substantially as set forth.

4. A die or mold for forming plastic material, having detachable sides or ends, and a removable bed-plate carrying the molded material, substantially as set forth.

5. A die or mold for molding plastic material, having detachable sides or ends, and a removable base-plate upon which the material is caused to adhere by the application of heat and pressure, substantially as set forth.

6. A die or mold for molding plastic material, having detachable sides or ends, and an independent removable base-plate or bottom, upon which plate the material is compressed, substantially as set forth.

7. A die or mold for molding plastic material, having an independent removable base-plate or bottom, upon which plate the material is compressed, substantially as and for the purposes set forth.

In testimony whereof I affix my signature in presence of two witnesses.

ISAIAH SMITH HYATT.

Witnesses:
 CHAS. C. GILL,
 HERMAN GUSTOW.